Aug. 14, 1934.   W. R. SEYFRIED   1,969,951
PROCESS FOR PRODUCING DICALCIUM PHOSPHATE
Filed Sept. 11, 1933
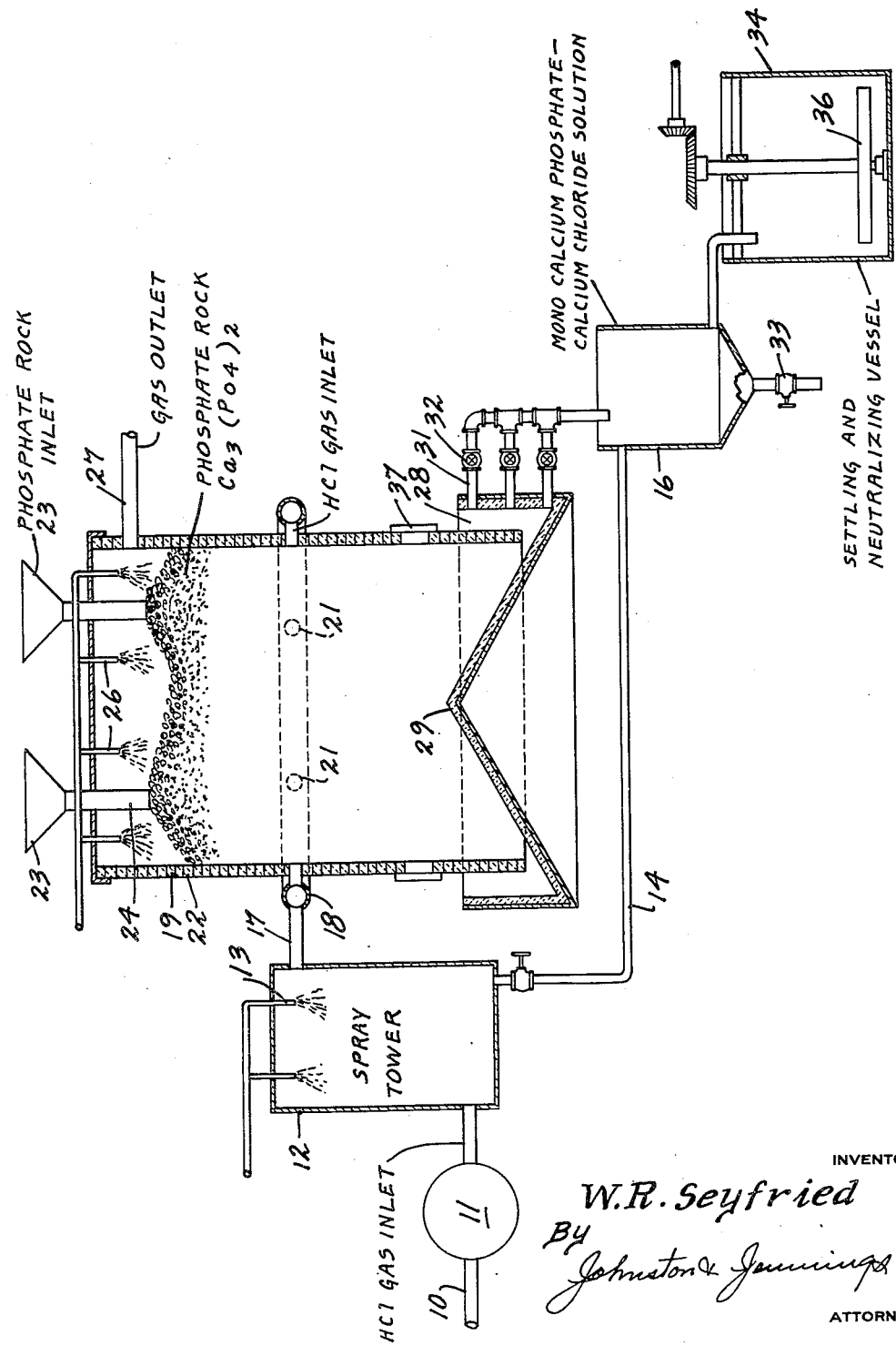
INVENTOR
W.R. Seyfried
By
Johnston & Jennings
ATTORNEYS Patented Aug. 14, 1934

1,969,951

UNITED STATES PATENT OFFICE 1,969,951

PROCESS FOR PRODUCING DICALCIUM PHOSPHATE

Warren R. Seyfried, Birmingham, Ala.

Application September 11, 1933, Serial No. 688,971

6 Claims. (Cl. 23—109)

My invention relates to the provision of a simple economical process for the digesting and leaching of undried, unground and low grade phosphate rock with waste hydrogen chloride gas.

A further object of my invention is to provide a continuous process for the digesting and leaching of phosphate rock and by means of which it is subjected to the action of hydrogen chloride gas in the presence of water and the solution thus formed is continuously removed from the reaction zone.

A specific object of my invention is to provide a process for producing calcium phosphates, particularly di-calcium phosphate in which waste hydrogen chloride gas is passed through a confined mass of unground phosphate rock and water is sprayed over the mass of rock to absorb the gas and combine with the rock.

The production of di-calcium phosphate, as heretofore known to me, has usually been carried out by reacting sulphuric acid with phosphate rock Ca$_3$(PO$_4$)$_2$ to produce a solution of mono-calcium phosphate, which solution is neutralized with lime to di-calcium phosphate. Other methods comprised the treatment of phosphate rock with hydrochloric acid to form a solution of calcium chloride and mono-calcium phosphate. By neutralizing this solution with lime, di-calcium phosphate is precipitated.

My invention contemplates an improvement on the last mentioned method in that waste hydrogen chloride gas from some other process, such as is formed in the production of sodium sulphate by the Hargreaves process, is passed preferably at a high temperature through a confined mass of phosphate rock over which water is being sprayed. By this means hot hydrochloric acid is continuously collected on the surface of the rock where it reacts with the rock, converting it into a solution of calcium chloride and mono-calcium phosphate. This solution is collected and neutralized to di-calcium phosphate by the addition of lime.

My improved process is made continuous by feeding phosphate rock downwardly through a suitable tower, provided with a water spray in the top thereof. Hydrogen chloride containing gases are continually passed upwardly through the mass of rock in the tower and the solution containing calcium chloride and mono-calcium phosphate flows continuously by gravity from the bottom of the tower where a liquid seal is provided to prevent the downward escape of the gases. The solution is then neutralized with lime to precipitate di-calcium phosphate, which is separated in the usual manner from the solution of calcium chloride.

In the accompanying drawing forming a part of this application, the single figure shows an apparatus particularly adapted for carrying out my improved process.

Referring to the drawing, hot gases containing from 10 to 20% hydrogen chloride, such, for example, as the waste gases resulting from the manufacture of sodium sulphate by the Hargreaves process, are passed from a conduit 10 through a booster pump 11 into a spray tower 12 provided with water sprays 13. As is well known, the gases leaving the converter in the Hargreaves process comprise chiefly a mixture of hydrogen chloride, nitrogen, steam and air and have a temperature up to 300° C. The spray tower 12 is utilized to reduce the temperature of the gases sufficiently for the purposes of this process.

The water with any hydrochloric acid which may be precipitated by absorption in the tower 12 passes outwardly through a conduit 14, from whence it is discharged into a receptacle 16.

The partially cooled hydrogen chloride containing gases pass from the spray tower 12 through a conduit 17 to a manifold 18 and from thence are fed into a conversion tower 19 through suitable openings 21.

While obviously my improved process may be carried out through a rather wide range of temperature, the gases in the tower 12 should be cooled to such a point that hydrochloric acid may be readily condensed, as hereafter described, in the tower 19. At the same time, the higher the temperature of the hydrochloric acid in the tower 19, the more rapid and more satisfactory is the reaction to be carried out. I have found that good results may be obtained by cooling the entering gases to a temperature of from 100° to 150° C.

The tower 19 is constructed so as to be acid resistant, preferably from carbon blocks 22. Phosphate rock is fed into the upper end of the tower through hoppers 23 having spouts 24 terminating within the tower, and the level of the rock is maintained up to the bottom of the spouts whereby the rock within the spouts maintains a seal against the escape of gases at all times. Preferably the phosphate rock is unground so that sufficient voids are provided in the mass to permit the ready passage of the hydrogen chloride containing gases therethrough. Suitable water sprays 26 extend downwardly into the tower whereby to spray water over the mass of rock within the tower. A gas outlet 27 is provided in the upper end of the tower for the escape of inert gases, which may lead to other apparatus or directly to the atmosphere, as desired.

At the bottom of the tower I provide a trough 28 extending around the lower part of the tower and having a cone shaped bottom 29 extending upwardly into the tower. The upper edge of the trough 28 extends above the lower edge of the tower 19, whereby to provide a liquid seal to prevent downward escape of the gases.

A suitable number of conduits 31 arranged at different levels and having valves 32 therein, provide a means for removing the contents of the trough 28, from which they pass to the vessel 16, where they are further acted upon by any acid which may be precipitated in the tower 12 and which is conveyed to the vessel 16 by the conduit 14. Insoluble residue in the phosphate rock is discharged periodically from the vessel 16 through a valve outlet 33.

The solution of calcium chloride and monocalcium phosphate formed by action of the hydrochloric acid on the phosphate rock in the tower 19 is passed to a settling, cooling and neutralizing vessel 34 provided with a mechanical stirrer 36. In this vessel 34, free acid in the solution may be neutralized by the addition of finely ground phosphate rock. After complete neutralization and settling of the insolubles in the solution, it is drained off and treated with dry lime or milk of lime to precipitate di-calcium phosphate in the usual manner.

In the operation of my improved process, the reactions which may occur in the tower 19 are as follows:

(1) $Ca_3P_2O_8 + 4HCl \rightarrow CaH_4P_2O_8 + 2CaCl_2$
(2) $Ca_3P_2O_8 + 6HCl \rightarrow 2H_3PO_4 + 3CaCl_2$

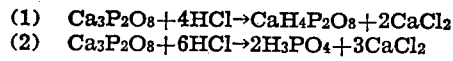

Reaction (1) is the preferred reaction with the solution being delivered into the vessel 16 having a free acid content not to exceed 2%. The acidity of the solution may be controlled by regulating the water sprays 26. During the operation, the inert gases passing through the tower act as a vehicle for diffusing the hydrogen chloride gas and bringing it into contact with the wet surfaces of the rock where it will react therewith.

It will be noted that the inlets 21 for the hydrogen chloride containing gases are placed substantially midway of the vertical height of the tower 19. This permits the hot gases to come in contact with the water trickling down over the rock, the rock providing the maximum of surface contact for the impinging gases. The result of this is that there is an immediate absorption of the hydrogen chloride gases by the water, forming liquid hydrochloric acid, which, at the high temperature, namely from 100° to 150° C., strongly reacts with the phosphate rock. The solution thus formed passing downwardly and by gravity into the trough 28, should contain not to exceed 2% free acid by the time it reaches the trough 28. Under ordinary conditions it is preferable to maintain a liquid seal in the trough 28 to prevent the hydrogen chloride gases from passing outwardly at the bottom of the tower.

The action of the hydrochloric acid, formed in the tower, on the phosphate rock also serves to reduce the vapor pressure of the solution in the tower and greatly aids in the absorption of more hydrogen chloride.

It will be obvious from the foregoing that I have provided a continuously operating process for producing di-calcium phosphate, in which the phosphate rock is continuously fed into the tower 19, and as it is reacted upon by the hydrochloric acid formed in the tower, it passes out at the bottom in the form principally of a solution carrying with it insoluble residue. In event insoluble matter accumulates in the tower 19 to such an extent that it is not carried out by the solution formed in the tower, I provide hand holes 37 in the sides of the tower near the bottom through which spray nozzles may be introduced to wash out the insoluble matter with water under pressure.

While I have shown my invention in but one form, it will be obvious to those skilled in the art that it is not so limited, but is susceptible of various changes and modifications, without departing from the spirit therof, and I desire, therefore, that only such limitations shall be placed thereupon as are imposed by the prior art or as are specifically set forth in the appended claims.

What I claim is:

1. A continuous process for the production of di-calcium phosphate which comprises feeding downwardly a confined mass of phosphate rock, spraying water over the mass, passing hydrogen chloride containing gas into the mass at a point substantially above its lower extremity at a temperature from 100° to 150° C. and causing said gas to flow upwardly through the mass and be absorbed in the phosphate rock, continuously collecting the resulting calcium chloride and monocalcium phosphate solution from the bottom of the mass, and further neutralizing with lime to form di-calcium phosphate.

2. A continuous process for forming di-calcium phosphate which comprises feeding unground phosphate rock downwardly within a confined zone, spraying water over the mass within the zone, passing hot hydrogen chloride gas into the mass intermediate its upper and lower extremities, providing a liquid seal for the bottom of the confined mass, continually taking off the resulting calcium chloride and mono-calcium phosphate containing solution from the confined zone below the point of introduction of the gases, and neutralizing the solution with lime to precipitate di-calcium phosphate.

3. In a process of producing di-calcium phosphate, the steps which comprise introducing gases containing from 10 to 20% hydrogen chloride into a confined mass of phosphate rock at a point near the top of the mass, spraying water over the mass and permitting the liquid acid to trickle downwardly through the mass, and collecting the resulting solution containing mono-calcium phosphate from the bottom of the mass.

4. In a process of producing di-calcium phosphate, the steps which comprise introducing gases containing from 10 to 20% hydrogen chloride into a confined mass of phosphate rock near the top thereof, spraying water over the mass and permitting the liquid acid to trickle downwardly through the mass, collecting the resulting solution containing mono-calcium phosphate from the bottom of the mass, and controlling the acidity of the solution by regulating the water sprays.

5. In a process of producing calcium phosphates, maintaining a downwardly descending charge of phosphate rock through a confined zone, introducing hydrogen chloride containing gas into the mass of rock at a point substantially removed from the lower extremities of the mass, spraying water over the mass to absorb the hydrogen chloride and digest the rock, and removing the liquid solution and insolubles from the bottom of the mass.

6. In a process of digesting phosphate rock, continuously feeding downwardly in a confined zone a mass of phosphate rock in lump form, spraying water over said mass, introducing into the mass at a point substantially above the lower portion thereof an acid gas capable of being absorbed by the water on the lump rock and reacting with the rock, and continuously leaching out the reaction products from the point of introduction of the acid gas to the bottom of the mass by the residual acid and resulting solution.

WARREN R. SEYFRIED.